United States Patent [19]
McGunigle

[11] 3,715,593
[45] Feb. 6, 1973

[54] AUTOMATICALLY ADJUSTABLE RADIOACTIVE RADIATION DETECTOR CIRCUIT

[75] Inventor: Richard D. McGunigle, Fullerton, Calif.

[73] Assignee: RdF West

[22] Filed: March 19, 1970

[21] Appl. No.: 23,107

[52] U.S. Cl. ....250/83.6 R, 250/83.3 R, 250/83.3 D, 250/106 T
[51] Int. Cl. ...........G01t 1/16, G01t 1/17, G01t 1/18
[58] Field of Search.........250/83.3 R, 83.6 R, 106 T, 250/83.3 D

[56] References Cited

UNITED STATES PATENTS

| 2,709,754 | 5/1955 | Davidon | 250/83.6 R |
| 2,984,746 | 5/1961 | Speh et al. | 250/83.6 R |
| 3,439,166 | 4/1969 | Chope | 250/83.3 D |
| 3,541,311 | 11/1970 | Taylor | 250/83.3 R X |

OTHER PUBLICATIONS

Radionuclides Measure Nose-Cone Wear In Flight, by E. R. Rathbun, from Nucleonics, Feb. 1961, pgs. 100 and 101.

Primary Examiner—Archie R. Borchelt
Attorney—Nilsson & Robbins

[57] ABSTRACT

A circuit for measuring short term variations in the average repetition rate of random input pulses, such as from a Geiger counter that monitors the sudden drop in radiation from a test plug containing radioactive wires as the ablative heat shield material is burned away during space vehicle reentry, has a variable one-shot multivibrator that is triggered by each input pulse to generate discrete pulses of selected amplitude and duration. The multivibrator pulses are integrated in a time averaging circuit having a relatively short time constant, compared to duration of the short term variation to be measured, to provide an output signal voltage indicative of the existing input pulse repetition rate. This output signal is delivered through a high gain feedback path having a buffer amplifier and a feedback storage circuit with a relatively long time delay to control a variable impedance element, such as a field effect transistor, in the multivibrator timing circuit to vary the pulse length to compensate for gradual changes in the input pulse rate, such as may result from the slow decline in Geiger counter output rate due to radioactive decay of the material used in the aforementioned test plug wires.

10 Claims, 2 Drawing Figures

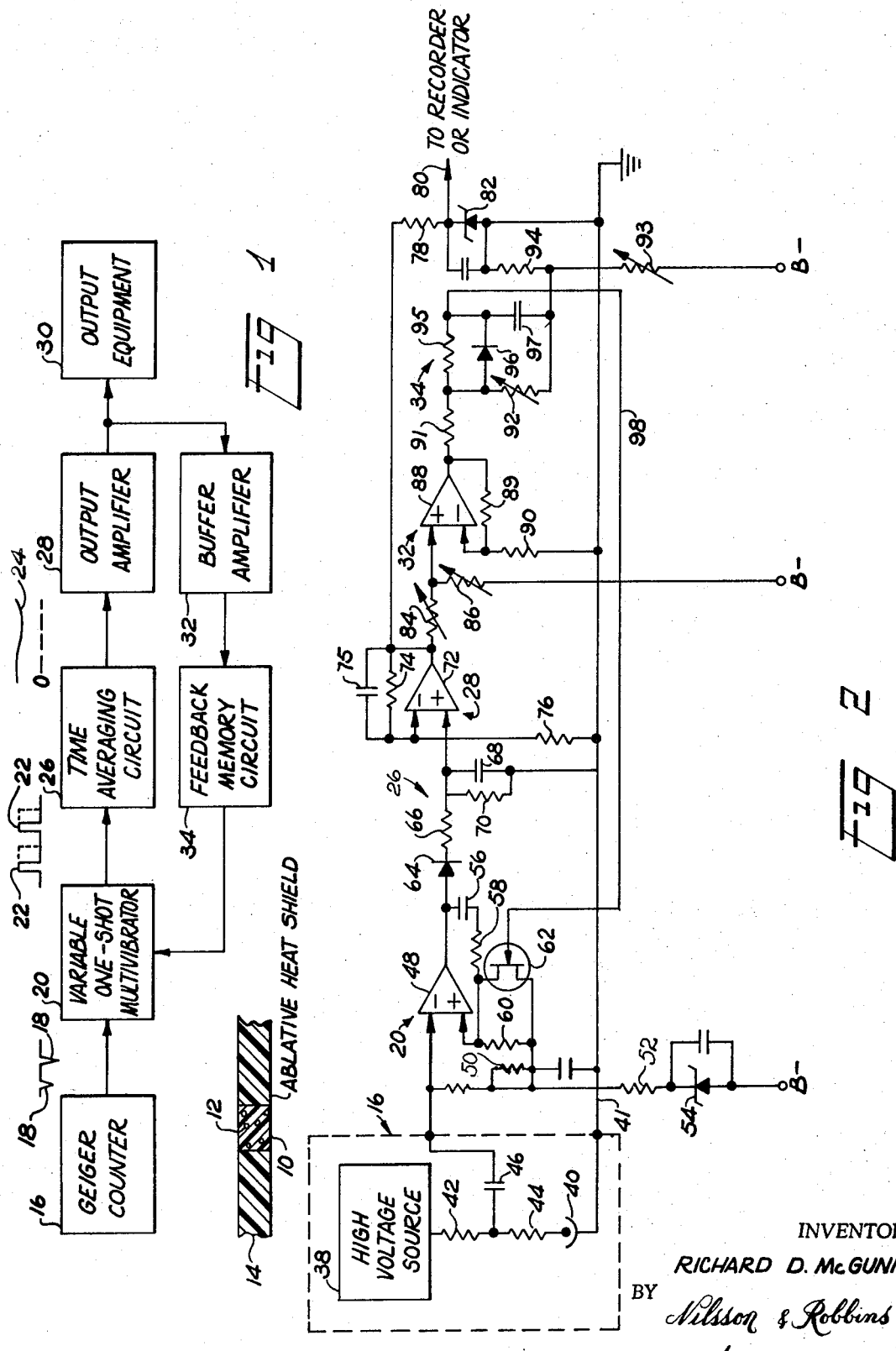

AUTOMATICALLY ADJUSTABLE RADIOACTIVE RADIATION DETECTOR CIRCUIT

BACKGROUND OF THE INVENTION

1. Field of the Invention

This invention relates to circuits for measuring short term level variations from a standard level subject to gradual long term change, and more particularly, to such a circuit for monitoring the ablative process during space vehicle reentry by measuring decreases in radioactive levels as radiation sources within a test plug forming a portion of ablative material covering the heat shield are burned away.

2. Description of the Prior Art

As is well-known, space vehicles reentering the earth's atmosphere employ heat shields covered with an ablative material that burns off during reentry to dissipate the tremendous heat generated by the frictional resistance of the atmosphere. Frequently, particularly in testing the effectiveness of different ablative materials for such reentry vehicles, it is desirable to measure and record the rate and extent of loss of ablative material during reentry. For this purpose, a test plug of ablative material containing apprpriate radioactive sources, such as tantalum carbide wires, is inserted to form an integral part of the ablative material covering the heat shield. As the ablation process occurs during reentry, the wires in the plug are burned away with the surrounding ablative material, thus rapidly reducing the total radioactive material. A conventional Geiger counter located within the vehicle adjacent to the plug senses the radioactive emissions from the plug and a sensing circuit responsive to pulses from the Geiger counter generates an output signal indicative of the sudden decreases in radiation.

Usually, these test plugs are constructed with individual radioactive wires within the ablative material disposed parallel to the heat shield surface at different distances along the plug, so that during the ablation process, as the plug at the level of each wire burns away, the wire is lost causing a step decrease in the total radioactivity sensed by the Geiger counter. The radioactive wires are distributed in the plug so that the total ambient radioactivity sensed by the Geiger counter would provide a full scale output signal level on the anticipated test date. To achieve this, the exact radioactivity strength and placement of each wire is determined empirically to account for the desired longitudinal spacing along the plug, the radiation absorption and scattering characteristics of the heat shield material, and the radioactive decay characteristics of the particular material used for the wires. However, estimated schedule dates for launching and recovering space vehicles have frequently to be revised, and often may be delayed for long periods during which the radioactive decay process significantly reduces the total ambient radiation level from the plug. Since it is impractical, if not impossible, to change the plug or its radioactive sources after installation in the heat shield, so that the ambient radioactivity may be restored to the desired level, the gain of the sensing circuitry must be adjusted to provide full scale response at available lower ambient radioactive levels.

In the past, reductions in ambient radiation levels of the plug resulting from radioactive decay have been compensated by making manual adjustments in various circuit components. This requires that the sensing circuitry be made readily accessible within the vehicle at all times until actual launch. In some instances, numerous circuit adjustments have to be made because of successive last minute delays. The necessity of providing ready access to the vehicle interior for these manual circuit adjustments not only complicates the vehicle design, but more importantly, the numerous manual adjustments constitute a serious potential cause of faulty measurements.

SUMMARY OF THE INVENTION

In the preferred form of the invention, as it is used in measuring the ablative process during space vehicle reentries, a conventional Geiger counter senses gamma radiation emitted from the tantalum wire sources disposed within a test plug to generate random pulses at an average rate proportional to the existing radioactivity level. A one-shot multivibrator with a variable timing circuit generates an output pulse with a constant amplitude and duration each time a pulse is received from the Geiger counter. Output pulses from the one-shot multivibrator are integrated by a time averaging circuit with a relatively short time constant to produce a signal voltage level corresponding to the average output level appearing at the output of the one-shot multivibrator over a number of successive pulse intervals, which voltage level is directly proportional to the intensity of the radiation. This voltage is then amplified by an output amplifier to provide an output signal indicative of the radioactivity of the source to be monitored or recorded by the appropriate test equipment.

This output signal is also applied through a buffering amplifier to be stored in a feedback memory circuit having a relatively long discharge time constant, which is many times greater than the maximum duration of the ablative reentry effect or other short term phenomena under study. The feedback voltage from the feedback memory circuit controls the impedance of a variable impedance element in the timing circuit of the one-shot multivibrator to vary the width of pulses generated to compensate for gradual changes in the ambient radiation level due to radioactiv e decay. The output signal to the test equipment is thus automatically maintained at full scale level prior to the test event in spite of gradual radioactive decay during unscheduled delays. In this way, the rapid decrease in the radiation caused by loss of the radioactive wires during ablative reentry can be measured as a proportional decrease from the full scale value of the output prior to the event.

In the preferred form of the invention, the voltages maintained in the feedback memory circuit is applied to the gate electrode of a field effect transistor (FET) to vary its resistance, thereby changing the time constant of the resistive-capacitive timing network of the one-shot multivibrator. If the voltage maintained in the feedback memory circuit decreases, the decreased voltage applied to the gate electrode of the FET increases the resistance between its source and drain electrodes that are connected in series circuit with the cross coupled feedback capacitor of the one-shot multivibrator. After being triggered, the pulse from the multivibrator output continues as this feedback capacitor charges until the voltage drop across it reaches a level sufficient to cut off the pulse. The increased resistance of the FET therefore reduces the flow rate of charging current through the capacitor, thus increasing the pulse duration to compensate for the lower pulse rate from the Geiger counter.

BRIEF DESCRIPTION OF THE DRAWINGS

FIG. 1 is an illustration in block diagram form of an automatically adjustable sensing circuit in accordance with the invention; and FIG. 2 is a detailed circuit diagram of a preferred form of the invention as illustrated in FIG. 1.

DESCRIPTION OF THE PREFERRED EMBODIMENT

Referring now to the generalized illustration of FIG. 1, a test plug 10 containing radioactive wires 12 fits into an opening provided in the ablative material layer 14 covering the heat shield of a reentry vehicle. The plug 10 is formed of the same ablative material as the rest of the heat shield layer 14 with the radioactive wires disposed within it at appropriate locations. Preferably, the radioactive wires 12 are longitudinally spaced along the plug parallel to the heat shield surface at different depths so that, as the surrounding ablative material is burned off during reentry, the radioactive wire source at the depth is burned away quickly to cause a step decrease in the total radioactive level.

A conventional Geiger counter 16 is mounted within the reentry vehicle adjacent test plug 10 to detect gamma ray emissions from the source wires 12. The wires 12 should be formed of a radioactive material having a high melting point to match the surrounding ablative material and a relatively slow radioactive decay rate. For example, tantalum carbide, which is most commonly used, has a melting point of 3,800°C. and a half life of 115 days. The radioactive strength and positioning of each wire 12 in the plug 10 is selected to produce preselected variations in the radioactive level sensed by an adjacent Geiger counter 16 as each is burned away during reentry ablation.

The Geiger counter 16 generates irregular negative pulses 18 at an average rate proportional to the total gamma ray activity being sensed. A controllable one-shot multivibrator circuit 20 coupled to the Geiger counter output generates a square wave pulse 22 of predetermined duration, as determined by its variable control setting, in response to each negative going pulse 18 from the Geiger counter 16. The pulses 22 are integrated in a time averaging circuit 26 to produce a DC signal 24 directly proportional to the pulse size and frequency over a relatively short time interval that includes at least several pulse intervals at the lowest anticipated pulse rate. This voltage level 24 developed in the time averaging circuit 26 may then be applied through an output amplifier 28 to produce an output signal to be monitored, recorded or transmitted by appropriate output equipment 30.

This output signal from amplifier 28 is also applied through a buffer amplifier 32 to be stored in a feedback memory circuit 34 capable of maintaining a constant voltage level over relatively long time periods compared to the duration of the ablative process or like phenomena under study. Typically, the time constant of the feedback memory circuit 34 is several orders of magnitude greater than the time constant of the time averaging circuit 26, and should be at least an order of magnitude greater than the duration of the ablative process or other phenomena. The voltage level maintained in the feedback memory circuit 34 operates as a continuous feedback control signal for varying the duration of the pulse 22 generated by the one-shot multivibrator, so that the energy in each square wave pulse 22 delivered to the time averaging circuit 24 is varied to compensate for long term variations in the frequency of the pulse 22. By this means, the signal level 24 produced by time averaging circuit 26 can be maintained at a constant level in spite of gradual decreases in radiation from the plug 10 due to radioactivity decay. However, during the relatively short time interval during which the ablating process occurs during reentry, the long time delay of the feedback memory circuit 34 effectively resists any change in the length of the pulses generated by the one-shot multivibrator 20, so that the signal level 24 from the time averaging circuit 26 decreases from its initial ambient level in proportion to the loss in total radioactivity resulting from the radioactive wires 12 within the plug 10 being burned away. Thus, the output signal can be maintained at a full scale level up to commencement of the ablating process and, as each wire source burns off, a step decrease in the output signal occurs as a fixed proportion of full scale output level.

Referring now to FIG. 2 which illustrates in more detail circuit components employed in a preferred form of an actual detector circuit in accordance with this invention, a simple circuit for the Geiger counter 16 has a high voltage source 38 applied across the electrodes of a Geiger tube 40 causing it to operate as a Geiger-Muller detector for gamma radiation. The high voltage source 28 is connected to the Geiger tube 40 through a pair of series connected, high valued resistors 42 and 44 typically having values of 1 and 4.7 megohms, respectively. The Geiger tube 40 is normally non-conducting until gamma radiation entering the tube ionization chamber produces an avalanche ionization effect permitting low resistance current flow between the tube electrodes. With the tube 40 conducting, a voltage drop is produced across the resistor 42 and appears at its common terminal connection with the resistor 44. However, the high resistance in the tube circuit limits current flow between the tube electrodes below the level needed to sustain ionization, and the avalanche effect is quickly quenched to restore the Geiger tube 42 to its non-conducting state. The momentary voltage drop at the common terminal between the resistors 42 and 44 is transmitted as a short negative output pulse 18 through DC isolating and signal coupling capacitor 46 each time the tube fires, and these pulses occur at an average rate proportional to the intensity of the gamma radiation being sensed.

The negative output pulses 18 from the Geiger counter 16 are applied as a triggering input to the variable one-shot multivibrator 20 consisting of an operational amplifier 48 having positive and negative input terminals designated by the adjacent + and − signs. Preferably, the amplifier 48 uses a pair of differentially coupled switching elements, such as transistors (not shown), with the control terminals of the respective switching elements being the positive and negative inputs. The amplifier circuit 48 is normally biased with only one of its switching elements conducting so that a small negative voltage appears at the output. A negative pulse 18 from the Geiger counter 16 applied to the negative amplifier input switches the amplifier 48 to its unstable state, cutting off the normally conducting switching element and causing the other to conduct, increasing the amplifier output to a fixed positive level, such as 5 volts. This positive output voltage is fed back through a variable R-C delay network to the positive amplifier input to maintain the switching elements in this state. The output voltage only returns to its normal, slightly negative level, when the positive feedback through the delay network has decreased to a point where the positive voltage level produced at the positive amplifier input is no longer sufficient to overcome the normal amplifier bias, and the amplifier 48 returns to its initial stable state.

A resistor 50 is connected to the common ground 41 and in series with a resistor pair 52,51 which is in turn connected to a B minus source, typically at 12 volts, through a Zener diode 54 that has reverse breakdown at 6 volts. This establishes a minus 6 volt level at the Zener cathode. The resistance of the resistor 50 is selected to maintain the desired trigger level for the amplifier 48 as described below. Therefore this voltage level may be changed according to any desired application by proper selection of the resistance value.

The output of amplifier 48 is coupled through a capacitor 56, in series with resistor 58 to the positive amplifier input, which is also coupled through a variable resistance network consisting of a fixed resistor 60 in parallel with the drain-to-source path through a field effect transistor (FET) 62 to the voltage reference level established by the resistor 50. When the amplifier 48 is triggered by a negative pulse 18 at its negative input terminal, the sudden voltage increases at its output immediately produces a feedback current flow for charging the capacitor 56. The magnitude of this feedback current is inversely proportional to the total resistance of the resistor 58 in series with the variable resistance network with the FET 62 in parallel with the fixed resistor 60. As the capacitor 56 charges, the feedback current flow gradually decreases, approaching zero at full charge. The resistance value of the resistor 58 is much smaller than that of the resistor 60, and the FET 62 in parallel so that the level of charging current is largely of direct function of the variable resistance of the parallel network. Initially, then, a positive voltage is produced at the positive input terminal of the amplifier 48 to maintain it in its unstable state generating the positive output pulse voltage. However, as the capacitor 56 charges, reducing the feedback current, the voltage of the positive amplifier input gradually drops to the normal bias level to which the negative input returns after receipt of each negative pulse 18, thus abruptly cutting off the positive voltage at the amplifier output. Accordingly varying the resistance in the drain-to-source path through the FET 62 changes the total resistance of the feedback path to control the charging rate of the capacitor 56 to vary the duration of the amplifier output pulse 22.

The positive voltage of the input pulses generated at the output of the amplifier 48 forward bias a diode 64 to pass current to the time averaging circuit 26 that consists of a resistor 66 in series with a capacitor 58 and a resistor 70 in parallel. Current flowing in the forward direction through diode 64 and resistor 66 charges the capacitor 68 after each pulse 18, the amplifier output returns to a slightly negative level to back bias the diode 64, and the capacitor 68 discharges through the resistor 70. The resistance values of the resistors 66 and 70 are selected to provide a desired charging and discharging rate for the capacitor 68. In this embodiment, the resistor 66 and 70 may have the same value of approximately 100 kilohms to give equal charge and discharge rates, with the capacitor 68 having a value of approximately one microfarad. After the voltage across the capacitor 68 reaches the desired operating level, each multivibrator pulse 18 delivers charging current to the capacitor 68 at a constant rate so that the charge added by each pulse is directly proportional to the pulse duration. Likewise, the capacitor discharges at a constant rate between pulses, the time constant of the time averaging circuit 26, as determined by the resistive and capacitive values chosen, should be great enough to provide an averaging interval extending over several pulse cycles at the lowest expected pulse repetition rate, but this time constant should be small enough to permit quick circuit response in decreasing the voltage level due to sudden changes in the pulse rate caused by the ablating of the test plug during reentry. By this means, variations in the voltage developed on the capacitor 68 is smooth to prevent rapid variations in the signal level developed across a capacitor 68.

The signal level voltage developed by the time averaging circuit 26, is supplied through an output DC amplifier 28 to the output equipment (not shown) where it can be recorded or used to operate an appropriate indicator. The output amplifier 28 consists of the conventional DC amplifier 72 of the type commonly known as a differential amplifier which receives the signal voltage level developed in the time averaging circuit 26 at a positive input, as indicated by the + designation. The output of amplifier 72 is coupled through a feedback resistor 74 in parallel with a capacitor 75 to a negative amplifier input that is also connected through a further resistor 76 to common or ground potential. The resistor 74 has a much larger resistance value than the resistor 76, so that their connection in series constitutes a voltage divider for supplying a small portion of the amplified output as a negative feedback to the DC amplifier 72 for stabilizing its operation. The feedback capacitor 75 provides a negative feedback for alternating current to cancel high frequency transient variations in the output signal, thus further smoothing the output to maintain the output signal level substantially constant.

The resulting output voltage is coupled through a small output resistor 78 to an output terminal 80, for connection to appropriate output equipment 30, such as recorders or indicators. The output terminal 80 is however connected to ground potential through a Zener diode 82 which has a reverse voltage breakdown corresponding to a small amount above the desired full scale value of the output signal. Thus, if the output signal level attempts to exceed this full scale value, the Zener diode 82 breaks down to clamp the output at the desired level to prevent its exceeding the desired level.

The output voltage from the amplifier 72 is also applied to a voltage divider circuit consisting of variable resistors 84 and 86 that are set to supply a preselected portion of the output voltage to a buffer amplifier 32 consisting of the DC amplifier 88 with resistors 89 and 90 connected in a voltage divider arrangement between the amplifier output and ground to supply a small amount of stabilizing negative feedback to the negative amplifier input. The output voltage from the buffering amplifier 88 is stored in the feedback memory circuit 34. In this particular embodiment, this amplifier output voltage is coupled through a very high valued resistor 91 (typically 22 megohms) to be selectively attenuated through setting of a variable resistor 92 to provide a lower voltage range more suitable for control of the field effect transistor 62. A voltage divider consisting of a variable resistor 93 and a fixed resistor 94 is connected between the B-minus power supply and ground to provide a preselected negative reference voltage at the common output terminal between these resistors. This negative reference voltage is directly coupled to the attenuating resistor 92 so that the attenuated signal level across it varies upward from this negative base level. An extremely high valued resistor 95 in parallel with a diode 96 conducts current flow through a capacitor 97 to the negative reference voltage terminal between resistors 93 and 94. The diode 96 is connected in the forward direction between the resistor 91 and the capacitor 97 so that when a positive voltage is initially developed across the attenuating resistor 92, such as when the circuit is energized, the capacitor 97 quickly charges to the appropriate voltage level. However, once charged the capacitor 97 can only discharge very slowly through the extremely high resistance of the resistor 95, which for example in this case may consist of four 22 megohm resistors connected in series to give a total resistance value of 88 meghoms. Accordingly, when any reduction in the output voltage level occurs, the diode 96 is back biased, and the capacitor 97 can only discharge very slowly through the extremely high resistance of the resistor 95 until the voltage across it reaches the lowered level developed across the resistor 92.

The voltage thus stored in the feedback memory circuit 34 across the capacitor 97 is applied through a feedback connection 98 to the gate of the field effect transistor 62 to control its resistance.

The source terminal of the field effect transistor 62 is maintained at the voltage reference level established by the resistor 50, as previously explained, but the drain voltage varies with the feedback voltage being delivered to the positive input terminal of the amplifier 48. The source-to-drain resistance of the field effect transistor 62 is substantially constant over this voltage range for any given value of the source-to-gate voltage. However, as the gate voltage becomes less negative with respect to the voltage at the source, the resistance between the drain and source decreases. Conversely, as happens in the operation of this circuit, as the potential at the gate decreases with respect to the source potential, the resistance exhibited by the field effect transistor 62 increases, thus increasing the total resistance to the flow of charging current through the capacitor 56 which charges more slowly to increase the width of each output pulse from the one-shot multivibrator 20. The greater width of each pulse delivers a greater charge to the capacitor 68 in the time averaging circuit 26, so that the output voltage is correspondingly increased. Since the input resistance at the gate electrode of the field effect transistors 62 is also extremely high, commonly in the order of several hundred meghoms or greater, so that the capacitor 97 is effectively prevented from discharging through the feedback connection 98.

The setting of the variable resistor 93 to establish the negative reference voltage for operation of the feedback memory circuit 34 is selected in accordance with the pinch off characteristics of the field effect transistor 62 so that at the maximum voltage developed across the capacitor 97, the gate voltage is always maintained below the voltage level of the source by a preselected amount to avoid pinch off.

Accordingly, in overall operation any decrease in the output signal from the output amplifier 28 is delivered through a feedback path consisting of the buffer amplifier 32 and feedback memory circuit 34 to increase the time constant of the variable one-shot multivibrator 20 to restore the output signal level to full scale. This memory feedback path has a high gain and a very long time delay so that it is only capable of responding to decreases in the output signal level over a relatively long time period.

As will be obvious to those skilled in this field, the particular circuits described herein and appropriate variations thereof would be useful in any similar test or measuring equipment wherein an effect being measured has a relatively short duration and it is necessary to compare the short term change with an initial level that may be gradually variable over long time intervals.

What is claimed is:

1. A detector circuit for sensing sudden variations from the ambient input level of a source subject to gradual variations in its ambient input level to indicate the magnitude of said sudden variations as a proportion of the previous ambient level comprising:

input means responsive to the instantaneous input level from the source for generating a first signal directly proportional to the instantaneous input level from the source;

a time averaging circuit having a relatively short time constant for developing an output signal level directly proportional to the present average energy level of said first signal;

feedback circuit means responsive to said output signal for developing a feedback signal, said feedback circuit means comprising a memory circuit with a relatively long time constant for delaying changes in said feedback signal for an extended time interval much greater than the time required for said sudden variations in the input level from said source and;

controllable impedance means responsive to changes in said feedback signal and coupled to said input means for controlling the average energy level of said first signal to maintain the output signal developed by said time averaging circuit at a substantially constant level during gradual variations in the ambient input level of the source.

2. A detector circuit for sensing a sudden variation from an ambient input level of a source subject to gradual variations in its ambient level to indicate the magnitude of said sudden variation as a proportion of the pre-existing ambient level comprising:
input means responsive to the input from the source for generating a first signal level directly proportional to the instantaneous input level;
circuit means responsive to the first signal level from said input means for developing an output signal level directly proportional to the existing average level of said first signal;
feedback means coupled to receive said output signal level for developing a feedback signal, said feedback means having a memory circuit with a relatively long time constant to delay selected changes in said feedback signal for an extended time interval greater than the interval required for said sudden variations in the input level; and
signal variable impedance means responsive to changes in said feedback signal and coupled to said input means for controlling the average of said first signal level to maintain the output signal level developed by said time averaging circuit at a substantially constant level during gradual variations in the ambient input level of the source.

3. The detector circuit of claim 2 further comprising:
an output circuit including voltage limiting means coupled to receive said output signal level for preventing said output signal level from exceeding a predetermined full scale level; and
wherein said feedback means and said signal variable impedance means comprise a high gain feedback path for controlling the average amplitude of said first signal.

4. The detector circuit of claim 2 wherein:
the input from said source constitutes random input triggering pulses generated at an average frequency indicative of said input level and,
said input means comprises a one-shot multi-vibrator circuit having a variable timing circuit including said signal variable impedance means for generating pulses of fixed amplitude and variable duration in response to each of said triggering pulses; and,
the duration of said pulses is varied by changing the impedance of said signal variable impedance means in response to said feedback signal to tend to increase the duration of said pulses in response to gradual decreases in said output signal level.

5. The detector circuit of claim 4 wherein:
said memory circuit comprises a storage capacitor with a high capacitance value and a network connected in series for applying said output signal level to storage capacitor, said network having a discharging resistor means having a very high resistance value and a unidirectional current flow element, coupled in parallel said capacitor being quickly charged by said output signal level through said unidirectional element to provide feedback signal and being capable of being discharged only through said resistor means with said relatively long time constant, whereby only decreases in said feedback signal are delayed for said extended time interval.

6. A radiation detection circuit for measuring a sudden variation in the radiation level of a radioactive source to indicate the proportional variation from a pre-existing ambient radiation level comprising:
a sensor means adjacent said source for sensing the existing radiation level to generate random triggering pulses at a rate proportional to the instantaneous radiation level;
variable multivibrator means responsive to said triggering pulses for generating a repetitive pulse signal with each pulse being generated in response to one of said triggering pulses and having a selectively variable duration and amplitude characteristic;
a time averaging circuit with a relatively short time constant substantially less than the duration of said sudden variation for developing an output signal voltage directly proportional to the average amplitude of said pulse signal over at least several pulse intervals
feedback means for receiving said output signal to develop a feedback signal having a relatively long time delay substantially greater than the duration of said sudden variation in radiation level; and,
signal variable impedance means coupled to receive said feedback signal for selectively controlling said multi-vibrator means to vary the duration and amplitude characteristics of said pulses to maintain said output signal level at a substantially constant predetermined level to compensate for the radioactive decay of said source.

7. The radiation detection circuit of claim 6 further comprising:
output circuit means for limiting said output signal voltage to a predetermined full scale level.

8. The radiation detection circuit of claim 7 wherein:
said feedback means comprises a storage capacitor coupled to be charged by said output signal and discharging resistor means having a very high resistance value to permit only very slow discharge of said storage capacitor to provide said relatively long time delay.

9. The radiation detection circuit of claim 8 wherein:
said variable multivibrator means includes a timing circuit coupled between its input and output that determines the duration of each pulse in said pulse signal; and,
said signal variable impedance means includes a field effect transistor having its drain and source terminals coupled to form a variable resistance path from the output of said multivibrator means and having its gate terminal coupled to receive said feedback signal for selectively controlling the amplitude and duration characteristics of said pulse signal.

10. The radiation detection circuit of claim 9 wherein:
said field effect transistor has its drain and source terminals coupled to form a variable resistance means for varying the time constant of said timing circuit inversely with respect to the level of said feedback signal at its gate terminal.

* * * * *